Patented Sept. 21, 1954

2,689,796

UNITED STATES PATENT OFFICE 2,689,796

PROCESS FOR HARD CANDY COATING FOOD PARTICLES

William F. Massmann, Elmer W. Michael, and Willard L. Vollink, Battle Creek, Mich., assignors to General Foods Corporation, New York, N. Y., a corporation of Delaware No Drawing. Application October 11, 1951, Serial No. 250,963

6 Claims. (Cl. 99—83)

The present invention relates to a process for producing candy coated articles and more particularly to one for the application of a candy coating to non-spherical, irregular or somewhat flat articles.

Heretofore candy coated articles have been prepared by agitating the articles to be coated with a quantity of thick syrup or molten candy. This may be carried out by stirring the mixture in a shallow pan or other vessel, by tumbling the mixture in a reel or by providing for any other suitable means of agitation. As a practical matter, agitation can only be used where the articles to be coated are substantially round so that they can be properly tumbled or rolled because the distribution of the candy is primarily effected by virtue of the articles rubbing against or rolling over each other. For the reasons set forth below, it has not been possible heretofore to use the obvious expedient of spraying the candy onto the articles to be coated and hence the application of a candy coating to non-spherical, flat or irregularly shaped articles such as chips, flakes and the like has not been accomplished, at least not on a large commercial scale.

In order to insure a candy coating which will set up or solidify after it has been applied it is necessary that the mixture of sucrose, dextrose, levulose and like sugars be boiled down until the moisture content thereof is about 2.5%, preferably below. Attempts to spray such molten candies have failed heretofore because during the holdup time required for spraying the use of the elevated temperatures required to provide the candy in a sufficiently fluid condition results in the development of an undesirable dark color and off-flavor. Attempts to solve the problem by reducing the holdup time have failed thus far, the aforementioned dark color and off-flavor developing at the required high temperatures even though a holdup time of only a few seconds is employed.

An object of the present invention is to provide a process for the application of a candy coating to non-spherical, irregularly shaped or even flat articles on a practical commercial basis.

Another object is to provide a method for the applicaation of a candy coating to articles which permits spraying the candy thereon with the resultant improved control and uniformity of candy distribution.

Other objects will be apparent from the description that follows hereinafter.

The present invention comprises a process whereby the fluidity necessary for spraying a molten candy and a hard coating free of color and off-flavor are provided. This is accomplished by heating a molten candy containing about 3.0%–6.5% moisture to a temperature within the range of about 320°–350° F., while maintaining the same under sufficient pressure so that the moisture remains in the liquid state in intimate contact with the sugars of the candy.

Generally, in applying hard candies by spraying it is necessary that the molten candy be heated to a temperature of at least 320° F. in order to provide the fluidity required for spraying. If lower temperatures are relied upon, the provision of the necessary fluidity requires that the molten candy must contain such relatively high percentages of moisture as to preclude the provision of a hard candy coating in the final product. On the other hand, heating a molten candy containing less than 3.0% moisture to a temperature of 320° F., or above, while providing the desired fluidity also results in the development of the aforementioned undesirable off-flavor and color. In addition, a molten candy or thick syrup containing a very low percentage moisture required in candy coating should not be heated to a temperature appreciably above 350° F. since at such temperatures rapid decomposition of the sugars can be expected to occur, said decomposition proceeding somewhat violently in some cases.

The moisture content of a molten candy boiling at 320° F., under atmospheric pressure is about 2.0%. Thus, it will be seen that it is necessary that when a molten candy containing 3.0% moisture is heated to 320° F. or above the candy must be maintained under a super-atmospheric pressure. Generally, it has been found that a gauge pressure of about 35 lbs./sq. in. is suitable for maintaining the moisture in the liquid phase in the case of a candy containing 3.0% moisture and heated to about 320° F. A gauge pressure of about 75 lbs./sq. in. is sufficient for the same purpose in the case of a candy containing 6.5% moisture and heated to a temperature of 350° F. Intermediate pressures are required for candies of intermediate moisture contents heated to intermediate temperatures. For convenience in operating, a gauge pressure of about 100 lbs./sq. in. is usually employed, particularly since the pressure is usually applied by means of the pump employed to force the molten candy through the spray orifice and convenience of operation requires the use of the higher pressure for spraying.

Usually, in order for the candy coating to harden and otherwise set up to the desired degree, it is necessary that the moisture content of the coating be about 2.5% or below. This requirement can be met even though the moisture content of the molten candy is maintained above 3.0% as recommended above, because on spraying the molten candy at 320° F. or above the excess moisture flashes off or vaporizes. Larger percentages of moisture may be employed provided the molten candy is heated to higher temperatures so that such larger amounts will be flashed off to provide a coating with only 2.5% moisture or less. A molten candy containing 4.0% moisture should be heated under pressure to a temperature of about 330° F. in order for the candy coating to contain only 2.5% moisture, one containing 5.0% moisture should be heated under pressure to a temperature of about 340° F., one containing 6.0% moisture should be heated to 345° F. and one containing 6.5% moisture should be heated to 350° F. If it is desired to increase the fluidity of the molten candy or to provide a candy coating containing less moisture than the aforementioned 2.5% in order to insure a harder coating, to minimize the tendency of the coated articles to cake or agglomerate or for any other reason, the syrup or molten candy containing 3.0%, 4.0% or 5.0% moisture can be heated to still higher temperatures than those given immediately above provided, of course, that the temperature of 350° F. is not exceeded. While candies containing 3.0% or 4.0% moisture can be heated as high as 350° F. greater care must be exercised in such a case than is necessary in the case of candies containing 5.0% or 6.0% moisture. The latter can in many cases be heated somewhat above 350° F. without detrimental results.

In handling a syrup of the usual composition employed for candy coating various articles it is generally preferable to boil the same down to about 4.5% moisture by heating to a temperature of 290° F. under atmospheric pressure and thereafter raise the temperature of said syrup to 335°–345° F. under a pressure of at least about 50 lbs./sq. in., more conveniently about 100 lbs./sq. in. The molten candy can be maintained at this elevated temperature for several minutes if the same is necessary for convenience in spraying and no off-flavor or color will develop. On being sprayed from the spray nozzle much of the moisture flashes off so that the coating ends up containing only about 2.0% moisture.

While as aforementioned the process of the present invention now makes it possible to apply a sugar coating to articles which heretofore could not be coated as a practical matter, particular advantage is enjoyed in the case of applying such a coating to cereal flakes, especially corn flakes which, because they are so thin and friable, could not possibly be coated by the methods available heretofore relying solely upon agitation. Thus, it is possible for the first time to prepare a sugar coated corn flake, wheat flake or the like on which the coating will be deposited with uniformity and control without the product containing the hard particles which result from the accumulation of candy when the latter is not properly distributed.

A specific example of the process of the present invention follows:

A syrup is prepared by dissolving 100 lbs. of sucrose, 10 lbs. of corn syrup, 30 lbs. of honey, ¼ lb. of sodium acetate, ½ lb. of salt in 50 lbs. of water and heating the same to 225° F. The syrup is then boiled down to a candy containing about 4.5% moisture by boiling the same until the boiling point of the candy reaches 290° F. at atmospheric pressure. At this point the candy is pumped under a pressure of 100 lbs./sq. in. through a cooking coil maintained at 340° F., the coil terminating in a spray nozzle having 1/16 in. diameter holes. The resultant spray of molten candy is directed onto the corn flakes which are being tumbled in a revolving reel. The candy coating which is thus applied to the corn flakes contains only about 2.0% moisture because of the evaporation of about 2.5% of moisture which occurs when the hot candy is sprayed and thus released to the atmosphere. As the candy coated flakes proceed from the reel they are deposited in a shallow bed on a traveling screen and cooled by cold, dry air being blown through the screen. The cooled corn flakes are the passed over a vibrating screen to be separated into individual flakes and are thereafter packaged.

While the present invention has been described in connection with particular embodiments and a specific example has been used to illustrate the same, it is not to be construed as limited thereby but rather reference should be had to the appended claims for a definition of the limits of the invention.

What is claimed is:

1. A process for hard candy coating articles which comprises heating a molten candy containing about 3.0–6.5% moisture to a temperature of about 320°–350° F. under pressure not less than the vapor pressure of the candy mix so that its moisture content remains in the liquid phase in intimate contact with the sugar and spraying said candy onto the articles to be coated, the moisture content of the candy being reduced at least to about 2.5% as a result of said spraying.

2. A process for hard candy coating articles which comprises heating a molten candy containing about 3.0–6.5% moisture to a temperature of about 320°–350° F. under a pressure of at least about 35 lbs.–75 lbs./sq. in., the higher pressures being required at the higher moisture contents and temperatures of the candy, and spraying said candy onto the articles to be coated, the moisture content of the candy being reduced at least to about 2.5% as a result of said spraying.

3. A process for hard candy coating articles which comprises heating a molten candy containing about 4.5% moisture to a temperature of about 335°–345° F. under a pressure of at least about 50 lbs.–60 lbs./sq. in. and spraying said candy onto the articles to be coated, the moisture content of the candy being reduced at least to about 2.5% as a result of said spraying.

4. A process for hard candy coating cereal flakes which comprises heating a molten candy containing about 3.0–6.5% moisture to a temperature of about 320°–350° F. under pressure not less than the vapor pressure of the candy mix so that its moisture content remains in the liquid phase in intimate contact with the sugar and spraying said candy onto the cereal flakes to be coated, the moisture content of the candy being reduced at least to about 2.5% as a result of said spraying.

5. A process for hard candy coating corn flakes which comprises heating a molten candy containing about 3.0–6.5% moisture to a temperature of about 320°–350° F. under pressure not less than the vapor pressure of the candy mix so that its moisture content remains in the liquid phase in intimate contact with the sugar and spraying said candy onto the corn flakes to be coated, the moisture content of the candy being reduced at least to about 2.5% as a result of said spraying.

6. A process for providing a hard candy coating on corn flakes which comprises heating a molten candy containing about 4.5% moisture to a temperature of about 335°–345° F. under a pressure of at least about 50 lbs.–60 lbs./sq. in. and spraying said candy onto the corn flakes to be coated, the moisture content of the candy being reduced at least to about 2.5% as a result of said spraying.

References Cited in the file of this patent

UNITED STATES PATENTS

| Number | Name | Date |
|---|---|---|
| 1,877,641 | Bolton | Sept. 13, 1932 |
| 2,196,395 | Kellogg | Apr. 9, 1940 |

FOREIGN PATENTS

| Number | Country | Date |
|---|---|---|
| 22,177 | Great Britain | of 1908 |

OTHER REFERENCES

"The Manufacture of Confectionery," by Robert Whymper, The St. Catherine Press, Stamford Street, London, S. E., 1923, page 13.